United States Patent
Gallagher et al.

(10) Patent No.: US 8,195,160 B2
(45) Date of Patent: Jun. 5, 2012

(54) SYSTEM AND METHOD FOR TELEPHONE EXCHANGE IN FEMTOCELL NETWORKS

(75) Inventors: Mark Gallagher, Newbury (GB);
Yashodhan Dandekar, Sunnyvale, CA (US)

(73) Assignee: Spidercloud Wireless, Inc., Santa Clara, CA (US)

( * ) Notice: Subject to any disclaimer, the term of this patent is extended or adjusted under 35 U.S.C. 154(b) by 395 days.

(21) Appl. No.: 12/551,380

(22) Filed: Aug. 31, 2009

(65) Prior Publication Data

US 2010/0056144 A1 Mar. 4, 2010

Related U.S. Application Data

(60) Provisional application No. 61/093,180, filed on Aug. 29, 2008.

(51) Int. Cl.
*H04W 4/00* (2009.01)
(52) U.S. Cl. ............... 455/435.1; 455/422.1; 455/435.2
(58) Field of Classification Search ................. None
See application file for complete search history.

(56) References Cited

U.S. PATENT DOCUMENTS

| | | | | |
|---|---|---|---|---|
| 5,513,184 | A * | 4/1996 | Vannucci | 370/350 |
| 2008/0304462 | A1* | 12/2008 | Burgess et al. | 370/342 |
| 2009/0086742 | A1* | 4/2009 | Ghai et al. | 370/401 |
| 2009/0131024 | A1* | 5/2009 | Osborn | 455/414.1 |
| 2009/0286540 | A1* | 11/2009 | Huber et al. | 455/435.1 |
| 2010/0027521 | A1* | 2/2010 | Huber et al. | 370/338 |
| 2012/0020314 | A1* | 1/2012 | Osborn | 370/329 |

* cited by examiner

*Primary Examiner* — Ajit Patel
(74) *Attorney, Agent, or Firm* — Foley & Lardner LLP

(57) ABSTRACT

The present application describes methods for performing proxy communications between mobile stations connected to a femtocell network and a central telephone network controlled by a network operator. In some embodiments, a private branch exchange is configured to temporarily assign identification numbers to the mobile stations connected to the femtocell network. Incoming calls are directed to the private branch exchange rather than the connected mobile stations. After receiving the incoming call, the private branch exchange routes the incoming call to the correct mobile station. In some embodiments, these methods also enable mobile stations to cross between femtocell coverage areas within the same femtocell network without constantly updating the central network operator.

20 Claims, 9 Drawing Sheets

SYSTEM AND METHOD FOR TELEPHONE EXCHANGE IN FEMTOCELL NETWORKS

CROSS-REFERENCE TO RELATED APPLICATIONS

This application claims the benefit of both U.S. Provisional Application No. 61/093,180 filed Aug. 29, 2008, which is hereby incorporated by reference in its entirety.

TECHNICAL FIELD

The present invention relates generally to communication networks, and more particularly, some embodiments relate to private branch exchange in networks employing femtocells.

DESCRIPTION OF THE RELATED ART

Licensed spectrum cellular systems are widely deployed by wireless carriers and generate substantial telecommunication revenues. These systems are normally deployed over a wide geographic area. Various techniques are often used for covering hard-to-reach places, for example repeats, cell-splits etc. These techniques are often unable to provide sufficient coverage for some cellular applications. Accordingly, femtocells are sometimes deployed to provide licensed spectrum cellular systems within tight geographic bounds, potentially covering a space as small as part of a room within a building, but more normally a small dwelling or business.

In a hierarchy of coverage, femtocells are typically designed to provide service areas of 100-1000 $m^2$ while macro-cells normally cover areas on the order of 10-100 $km^2$, micro-cells cover 1-10 $km^2$, and picocells cover 10,000-100,000 $m^2$ Licensed spectrum femtocells are usually designed to utilize a similar air-interface (base-station to handset) as the external macro-cell network so that the vast majority of devices can be used without any change.

Although femtocells allow efficient coverage of smaller, hard-to-cover locations, their use in large scale coverage often involves more cell sites. This level of scalability may exceed current normal operational bounds and standards because existing systems or architectures may have pre-defined limits on the number of cells. These predefined limits may be greatly exceeded by deployment of a femtocell system. Furthermore, the coexistence of multiple femtocells, or femtocells along with other cellular systems, can cause interference and handset registration difficulties.

Many femtocell network deployments are not significantly structured or preplanned. Rather, these networks often comprise a plurality of ad hoc or deployed-as-needed femtocells. This ability allows the femtocell networks to be highly configurable and able to adapt to meet the requirements of many different deployment environments. For example, some networks might scale to 1 million femtocells, any of which might enter or leave the network at any time.

In some networks, a femtocell network operator, such as a business owner, might run and operate an entire network of femtocells for a selected group. For example, an office building might deploy a femtocell network to provide mobile telephone access to the employees therein. In these environments, many businesses might desire to forgo the use of typical landline phones or VOIP phones in favor of a mobile Internet business telephone network that allows their employees to use their mobi le devices as fixed or desktop replacements. However, to replace a landline or VOIP system, a private branch exchange (PBX) that provides similar functionality VOIP or landline PBXs is typically desired. However, because of the dynamic nature of a femtocell network it is difficult to implement a femtocell network PBX.

BRIEF SUMMARY OF EMBODIMENTS OF THE INVENTION

The present application describes methods for performing proxy communications between mobile stations connected to a femtocell network and a central network operator. A private branch exchange is configured to temporarily assign identification numbers to the mobile stations connected to the femtocell network. Incoming calls are directed to the private branch exchange rather than the connected mobile stations. Accordingly, the private branch exchange routes the incoming call to the mobile station.

According to an embodiment of the invention, a method for operating a private branch exchange on a femtocell-based cellular network comprises receiving a request to register a mobile station; generating an identification for the mobile station; transmitting the identification to the mobile station; registering the identification with a network operator; receiving an incoming telephone call destined for the mobile station; and routing the incoming telephone call to the mobile station.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

DETAILED DESCRIPTION OF THE EMBODIMENTS OF THE INVENTION

The present application describes methods for performing proxy communications between mobile stations connected to a femtocell network and a central telephone network controlled by a network operator. In some embodiments, a private branch exchange is configured to temporarily assign identification numbers to the mobile stations connected to the femtocell network. Incoming calls are directed to the private branch exchange rather than the connected mobile stations. After receiving the incoming call, the private branch exchange routes the incoming call to the correct mobile station. In some embodiments, these methods also enable mobile stations to cross between femtocell coverage areas within the same femtocell network without constantly updating the central network operator.

Figure 1:
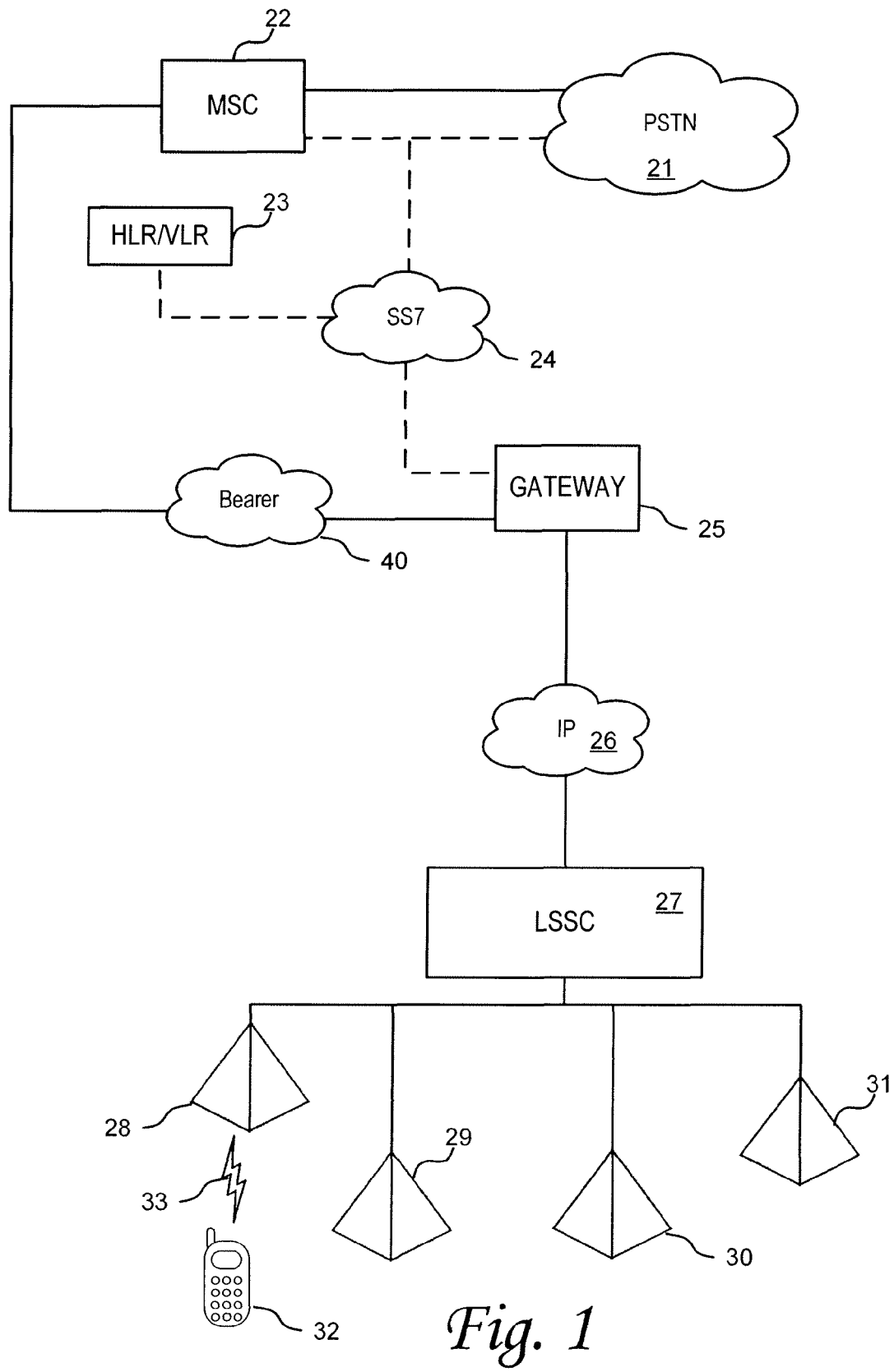
FIG. 1 illustrates the deployment of a system in accordance with embodiments of the invention.

Before describing the invention in detail, it is useful to describe an example environment in which the invention can be implemented. One such example is that of femtocell network deployed in an environment where all or a group of the femtocells are under common control. FIG. 1 illustrates such an example environment. In this environment, a plurality of femtocells 28, 29, 30, and 31 provide cellular access coverage to a mobile user equipment 32 over the air interface 33. In this environment, the femtocells 28-31 are under common control and interact with a licensed spectrum switch controller (LSSC) 27 to share a connection to an IP network 26. For example, LSSC 27 may comprise an apparatus or system as described in the co-pending US patent application entitled System and Method for Femtocell Management, which claims priority to U.S. Provisional Application No. 61/095,099 filed Sep. 8, 2008 and U.S. Provisional Application No. 61/0931,190 filed Aug. 29, 2008. In other embodiments the LSSC may comprise any device configured to allow multiple femtocells to coexist. For example, a plurality of deployed femtocells may be preconfigured to operate on non-interfering sub-bands of the licensed spectrum. Accordingly, in these embodiments the LSSC might comprise a router configured to allow the femtocells to share an internet connection. Alternatively, the LSSC may be a standalone device configured to connect to the femtocells and receive mobile station and PBX information, as described herein. In still further embodiments, the LSSC or the functions thereof may be incorporated into other network devices. For example, the LSSC described herein may comprise a femtocell or a PBX itself.

In this environment, the femtocells 28-31 are connected to an IP network 26 by way of LSSC 27. For example, LSSC 27 may provide routing and switching functions to enable multiple femtocells to share a single IP connection. However, in other environments, the femtocells 28-31 may be directly connected to IP network 26. A connection to the public switched telephone network (PSTN) 21 is provided by a gateway 25 connected to the IP network 26. In some environments, the connection between a mobile UE 32 to a receiving device is handled by a mobile switching center (MSC) that uses a home location/visitor location register (HLR/VLR) 23 to create a communications channel between a mobile device and the receiving device, for example by using an SS7 network 24.

From time-to-time, the present invention is described herein in terms of this example environment. Description in terms of this environment is provided to allow the various features and embodiments of the invention to be portrayed in the context of an exemplary application. Alternative environments than are shown may be employed in different environments. For example, the architecture described herein can be extended to pico, micro or macro-cell systems. After reading this description, it will become apparent to one of ordinary skill in the art how the invention can be implemented in different and alternative environments.

Figure 2:
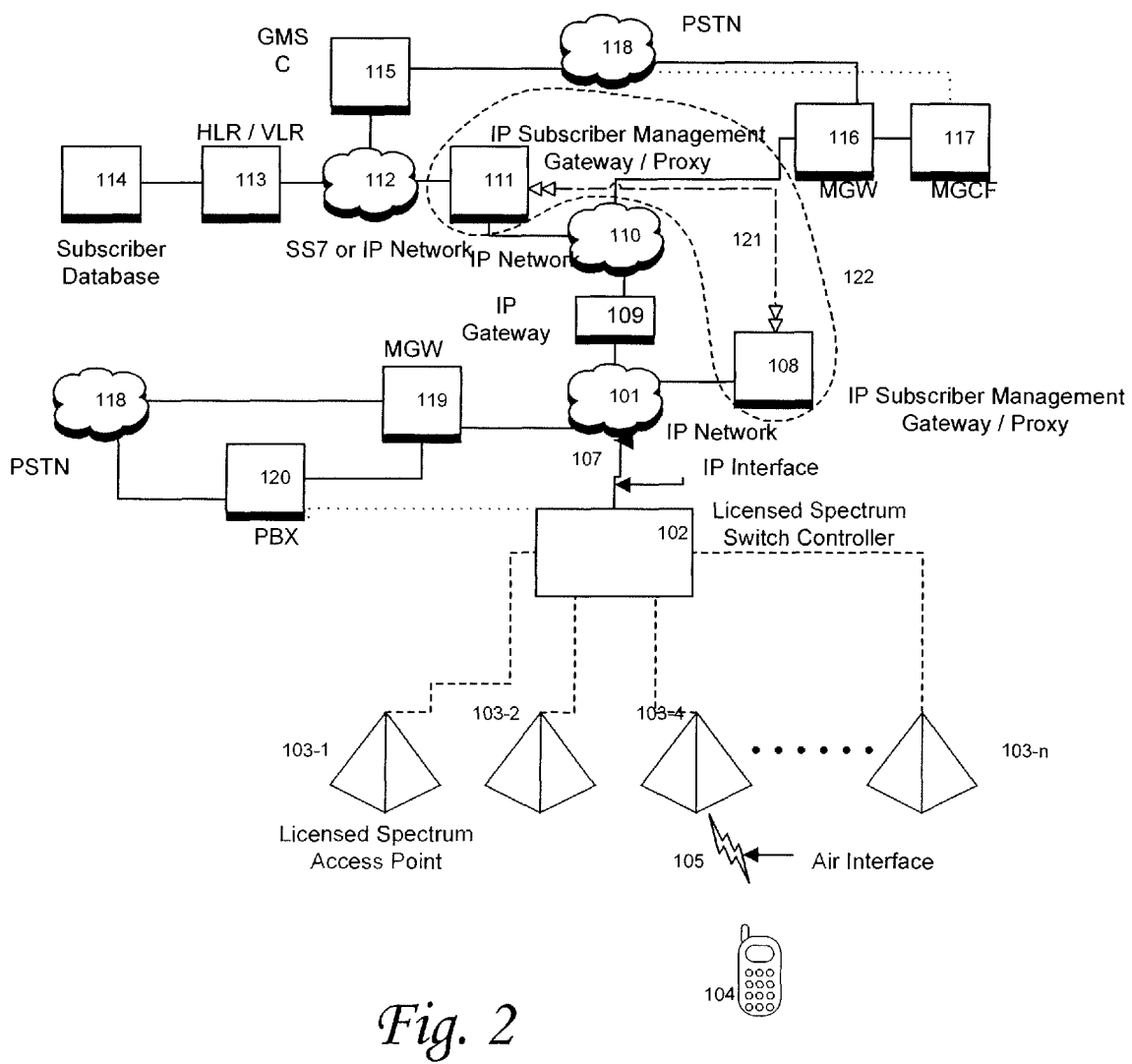
FIG. 2 illustrates a system architecture according to an embodiment of the invention.

FIG. 2 illustrates a deployed femtocell and PBX system according to an embodiment of the invention. In this embodiment, various network elements are connected via an IP network infrastructure 101. Although various network elements or modules are depicted or described as remote or local as compared to femtocells 103-1 to 103-n, in other embodiments, parts of this network architecture may be connected in alternate manners. For example, in some embodiments, PBX 120 may be connected directly to LSSC 102, rather than by way of IP network infrastructure 101, or may even constitute a component of LSSC 102. In this embodiment, femtocells 103 are connected to the rest of the system by way of an IP interface 107 and an LSSC 102. Here, an LSSC 102 provides a connection for femtocells 103 to IP network 101. In some embodiments, LSSC 102 may provide a network connection for the plurality of femtocells to share. According, in this embodiment, LSSC 102 may comprise a network router or switch. In further embodiments, LSSC 102 may provide various other functionality, such as automatic network configuration, automatic femtocell configuration, and dynamic control of femtocell transmission characteristics. In still further embodiments, various other network functionality described herein or various other modules described herein may be incorporated into an LSSC 102. In additional embodiments, LSSC 102 might comprise a femtocell itself. For example, a femtocell might be further equipped with routing functions, such that it can share its connection to an IP network 101 with a plurality of other femtocells. The illustrated network architecture further comprises a plurality of femtocells 103 that are connected to the LSSC 102 and provide a medium for a mobile user equipment 104 to connect to the PSTN 118 via the air interface 105.

In the illustrated embodiment, the IP network 101 comprises a private IP network, for example a local area network existing within an office or other location where the femtocell network is deployed. Accordingly, an IP Gateway 109 is provided to connect to an external IP network 110, such as the Internet. The network architecture further comprises an IP Subscriber Management Gateway (IPSMG)—or proxy thereof—such as gateway 108. In some embodiments, this gateway/proxy is directly connected to the IP network 101 and may comprise a subscriber database or a proxy to connect to a carrier system's database, such as a RADIUS gateway or proxy. In additional embodiments, the functionality of this device may be subsumed directly into LSSC 102. In connection with the gateway/proxy 108, a second IP subscriber management gateway/proxy 111 is employed in the network architecture. In some embodiments, this gateway/proxy might be implemented as a AAA server. In still further embodiments, the IPS energy could be configured to directly translates from the protocol used by the LSSC into SS7. Additionally, the IP SMG might be configured to provide an E-interface, as described in various standards bodies, that contains a protocol understood by the MSC. In this embodiment, the incorporation of an interface enables the LSSC to be proxied without direct connection to the HLR or the MSC.

This may provide benefits for optimization of call routing by reducing network traffic requirements. In additional embodiments, this method of using an E-interface can be applied to both the LSSC and the PBX, either independently or codependency, according to the call routing optimization desired. For example, if the on-site local switching is more desirable, then the LSSC may be proxied using the E-interface and the PBX may remain local.

In the illustrated embodiment, the IP subscriber management gateway/proxy 111 is used to mediate connections through the PSTN 118 and the IP network 110. For example, it maybe connected to an IP network or SS7 network 112 that is used to transfer SS7 or SS7 messages over IP. In other embodiments, similar functionality may be achieved using other systems such as a SIGTRAN system. A home location register or a visitor location register (HLR/VLR) 113 is further provided in the network architecture to maintain a centralized database of registered mobile users authorized to utilize the core mobile network. A central subscriber database 114 may be in communication with the HLR/VLR 113 to determine if a particular mobile user should be placed on a HLR, or a VLR according to where they are currently located as compared to their default home location.

A gateway mobile switching center (G-MSC) 115 interfaces with the PSTN 118 and determines which visited MSC a subscriber who is being called is currently located. The G-MSC 115 connects the cellular network to the PSTN. Additionally, G-MSC 115 utilizes the HLR/VLR 113 and the SS7 network 112 to route mobile to mobile and PSTN to mobile calls through itself. PSTN 118 is further connected to a media gateway (MGW) 116 that mediate the connection between the PSTN 118 and the IP network 110. A media gateway control module 117 is further provided to control the media gateway and receive control messages from the PSTN 118.

The illustrated network architecture further comprises a media gateway 119 (MGW). This media gateway may be connected to the internal IP network 101 and configured to perform various control functions with an internal PBX 120 and mobile stations 104 connecting via the local femtocells 103. In additional embodiments, MGW 119 is further connected to the PSTN 118; for example, this connection might be used to provide Centrex-type central PBX services. In further embodiments, the MGW 119 or the functionality thereof might be directly incorporated into LSSC 102 or one or more of the femtocells 103. The system architecture further comprises a PBX 120 that may be installed in a carrier or customer premises.

In some embodiments, systems are able to operate without a direct SS7 connection to the operator, but to remain within the network operator domain for mobile-terminated calls and messages. To perform these functions, a system and HLR is automatically updated with a system location that corresponds to the location of a femtocell network LSSC, rather than to a femtocell itself. These embodiments both reduce overhead required by a network operator and enable PBX routing functionality to be implemented without direct SS7 network connections. In some embodiments, pre-existing mobile networks may be pre-equipped with certain features that can be taken advantage of to allow such registrations. For example, an HLR may be configured to allow Extensible Authentication Protocol (EAP)-based messages such as EAP-SIM or EAP-AKA messages for mobile device location updates. In other embodiments, any acceptable key management messaging may be used for the device location updates. Furthermore, in future generation cellular systems, such as fourth or fifth generation systems, if other EAP-based messages for key management are developed, these messages will likely serve as acceptable alternatives for mobile device location update. In these embodiments, these EAP-SIM/EAP-AKA messages may be utilized to assign a location of a user device to a PBX rather than to the user device itself. When incoming calls arrived, they are therefore directed the PBX instead of the user device. In these embodiments, the PBX is equipped with functionality to route incoming calls from the PBX to the user device. Although various methods and functionalities are described using EAP-based messaging, in other embodiments any other suitable messaging may be employed.

Figure 3:
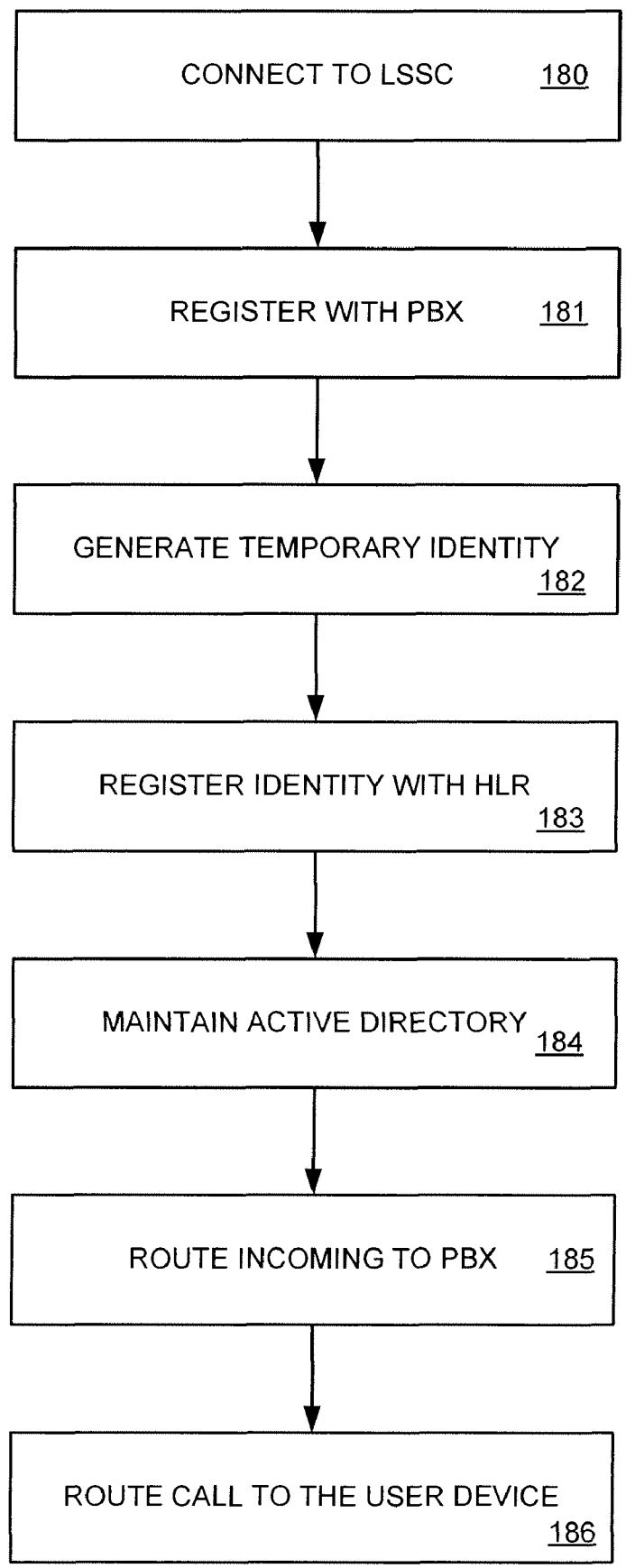
FIG. 3 is a flow diagram illustrating a method of system operation according to an embodiment of the invention.

FIG. 3 illustrates a method of operation according to an embodiment of the invention. In this embodiment, a mobile station connects 180 to an LSSC. In some embodiments, this connection 180 may comprise providing registration and identification information to the LSSC for further system use. After the mobile device is connected, the LSSC registers the presence of the device 181 with a system PBX. In some embodiments, this registration step may comprise the LSSC informing the PBX that the user device should remain associated with the LSSC until a predetermined disconnection event occurs. After the LSSC has registered the user device with the PBX, the PBX generates a temporary identity 182 for the device. In some embodiments, this temporary identity may comprise an extension that is pre-associated with the user device and that is reused whenever the user device connects to the LSSC. In some embodiments, a SIP identifier—such as a SIP-URI—may serve as such a temporary identity. In other embodiments, other identifiers that are unique to the mobile station may serve as these identities. In other embodiments, the temporary identity may be determined arbitrarily according to system needs. In still further embodiments, the temporary identification number assigned to a specific mobile station may be selected from one or more pre-assigned identification numbers that the PBX has registered with the network operator. By temporarily associating a mobile station with such a identification number, the PBX may enable a larger number of local stations to utilize the femtocell communications network than would otherwise be possible if each mobile station were required to register separately with the femtocell to which it connects.

In various embodiments, the adoption of such a PBX registration system allows PBX features to be implemented without significantly increasing external network traffic. For example, in one embodiment, a PBX may maintain a register of which mobile stations are connected to which femtocells. Accordingly, in addition to using the proxy method of an SS7 or other type of signaling network for the LSSC, PBX, or other local network device, the PBX can recognize that a call originating from a mobile station within the network is destined for another mobile station within the network. Accordingly, the PBX can perform local call switching to avoid the requirement for network traffic to occur between the external cellular network and the internal femtocell network. Accordingly, in these embodiments, extension based calling, for example, based on four digit extension numbers, may take place entirely within the local femtocell network without requiring communications overhead and without requiring that cellular network operators maintain additional network devices or modules to allow these operations. These embodiments allow additional PBX type features to be implemented within the mobile femtocell network, such as call hunting or automatic voicemail forwarding. For example, because the PBX or LSSC or other device maintains a register of call states, a incoming call originating from an external source may be automatically forwarded to the proper location according to whether or not the destination mobile station is free.

In the illustrated embodiment, after generating the temporary identification, the PBX registers the identity with an HLR 183. Registering the identity with the HLR 183 allows the system to direct 185 mobile calls destined for a specific mobile station to the PBX 121 that is associated with the mobile station. In some embodiments, the step of registering the identity with the HLR 183 comprises updating the HLR or VLR at the network operator to indicate that the mobile station's location is the same as the PBX. Accordingly, the network operator will direct incoming calls to the PBX rather than the mobile station, allowing the PBX to complete the step of routing the incoming call to the mobile station. In femtocell networks comprising a plurality of overlapping coverage areas, a mobile station moving within the network will be frequently handed-off between areas. In these embodiments, this registration with the PBX, or in some cases the LSSC, may avoid the requirement for the mobile station to constantly communicate with the network operator. By mitigating these excess communications, some embodiments enable the increase of the quality of actual data or voice communication. Once an incoming call is directed to the PBX, because the PBX has a registration with the LSSC, it is able to route 186 incoming calls to the proper mobile station.

In further embodiments, an additional module, such as an IP managing subscriber gateway as described with respect to FIG. 2, element 108, may be configured to maintain an active directory 184 of the states of registered user devices. For example, the LSSC may be configured to communicate with such a gateway to allow the gateway to maintain a register of the current state of user devices connected to the LSSC. For example, the gateway could maintain a register or directory of whether or not user devices connected to the LSSC are able to receive incoming calls. The gateway may be further communication with a PBX such that the PBX can query the active directory to aid in routing incoming calls 185.

Figure 4:
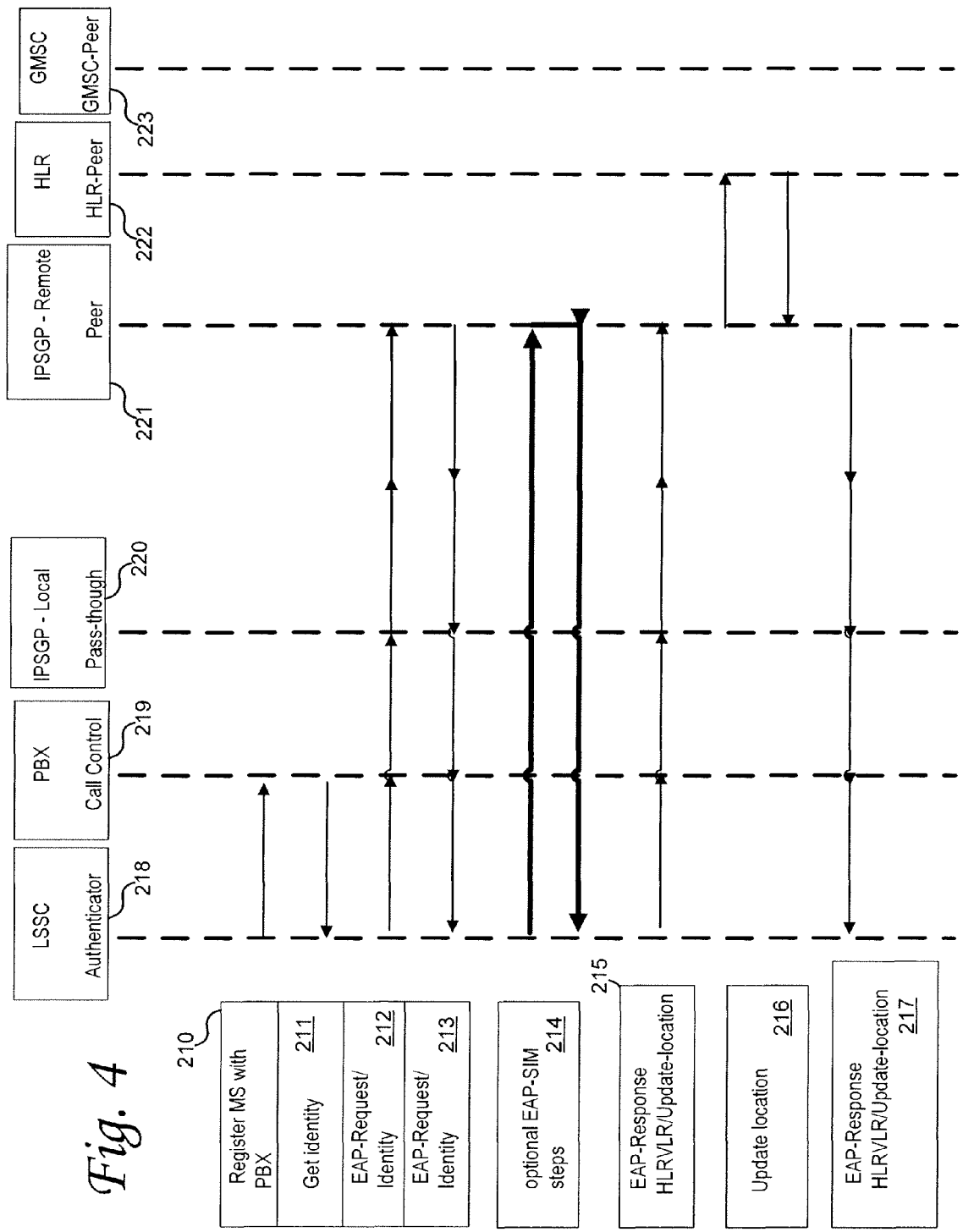
FIG. 4 is a flow diagram illustrating mobile station connection operations according to an embodiment of the invention.

FIG. 4 illustrates an example process of mobile user registration utilizing EAP messaging protocols according to an embodiment of the invention. In this embodiment, the mobile station is registered with the PBX 210 by the LSSC 218. As described herein, the PBX 219 responds to the request for registration 210 with a temporary identity 211. When the LSSC 218 is given the temporary identity, it is able to transmit a EAP request for identity message 212 to the IP SGP 221. In this embodiment, the IP SGP 221 provides an EAP-request/identity acknowledgment message 213 that enables the system to perform optional EAP-SIM functionality 214. After these optional steps have been performed, the system transmits an EAP-response to the identity request acknowledgment with an HLR VLR update location message 215. The IP SGP 221 receives this message and updates the location 216 with the HLR 222. After the location has been updated with the HLR, the IP SGP 221 responds to the request 217, allowing the LSSC to know that the mobile station is authorized to perform communications activities.

Figure 5:
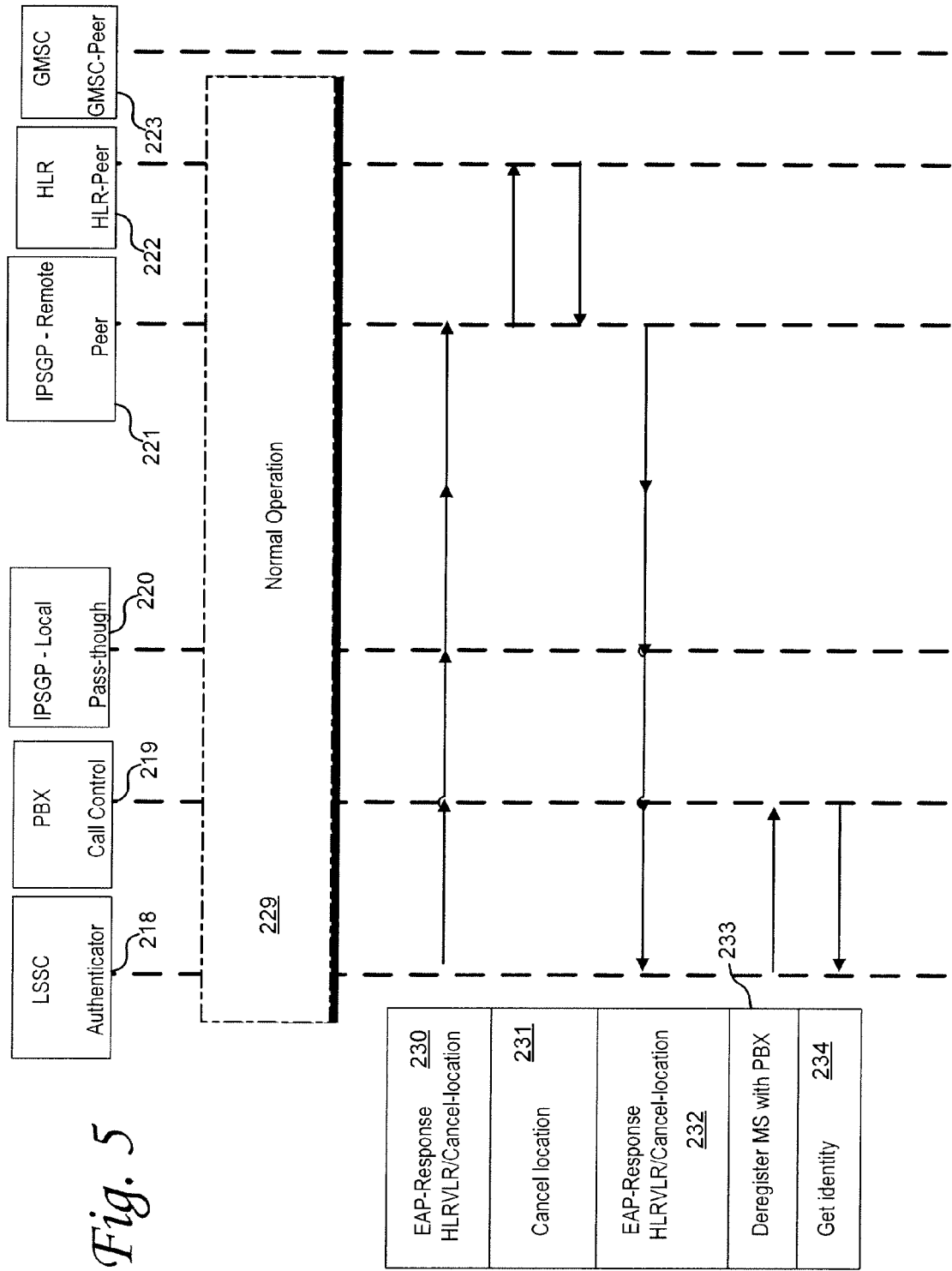
FIG. 5 is a flow diagram illustrating mobile station disconnection operations according to an embodiment of the invention.

FIG. 5 illustrates a process of mobile station disconnection according to an embodiment of the invention utilizing EAP protocol messaging. In the illustrated embodiment, after normal communication operations have ceased 229 and the mobile station will be disconnected from the system, the LSSC 218 transmits an EAP-response message 230 instructing the HLR to cancel the HLR VLR location. This message is transmitted to the IP SGP 221, which then performs location cancellation functions 231 with the HLR 222. After the HLR has canceled the LSSC's location, the IP SGP 221 transmits an EAP-response to the HLR VLR cancel location message 232. After the LSSC 218 receives this message, it is able to de-register the mobile station with the PBX 233. After the mobile station has been de-registered, the LSSC 234 is able to release the identity used by the mobile station during the communication operations such that the mobile station is allowed to connect at other locations.

Figure 6:
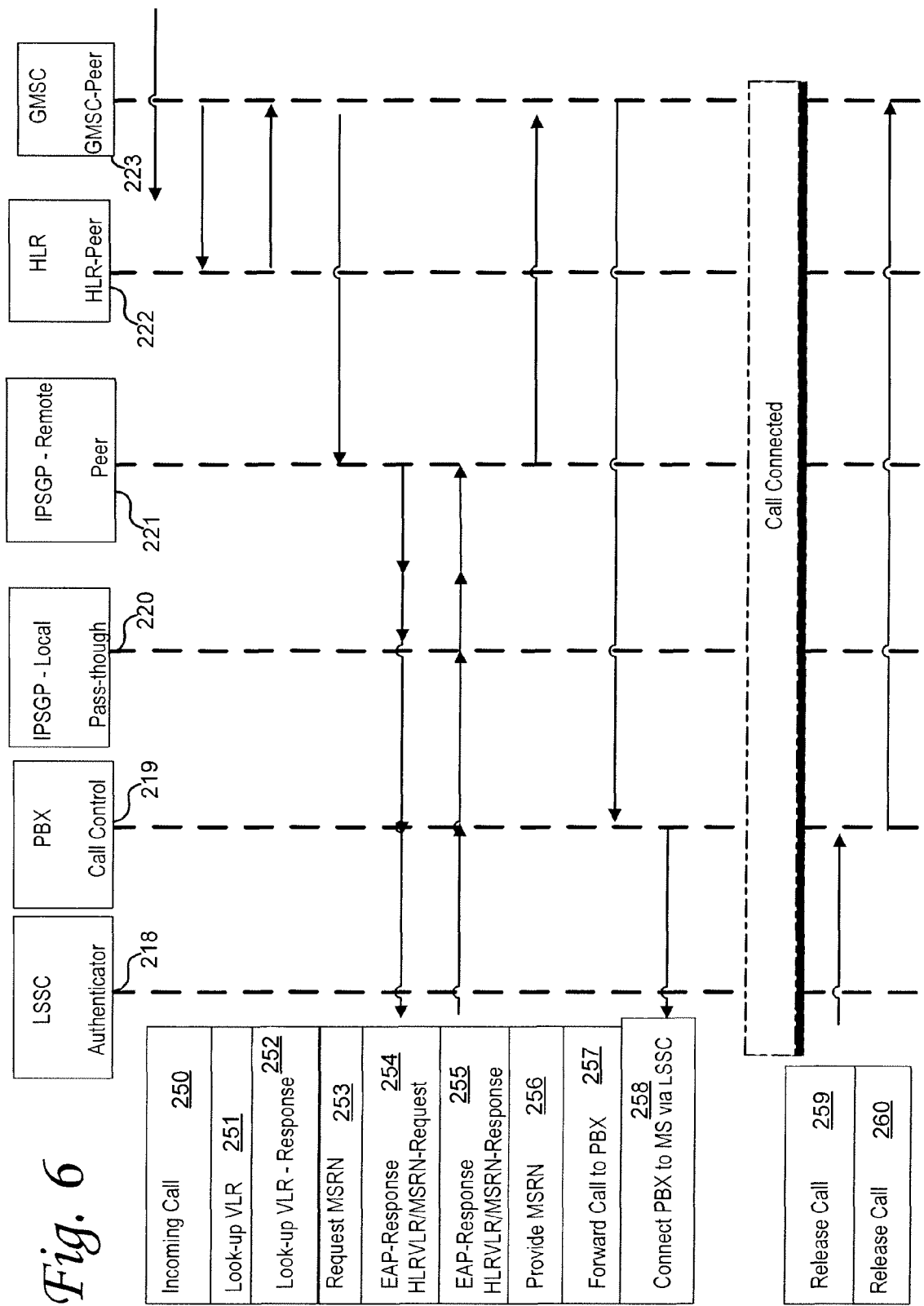
FIG. 6 is a flow diagram illustrating call routing procedures according to an embodiment of the invention.

FIG. 6 illustrates a process of handling incoming calls according to an embodiment of the invention utilizing EAP protocol messaging. After an incoming call 250 is received by the GMSC 223, for example as it would be received from an incoming call through the PSTN, the GMSC 223 performs lookup operations 251 and 252 with the HLR 222. In the illustrated embodiment, the lookup operations may comprise querying the HLR to determine the location currently associated with the destination device of the incoming call. After receiving the response 252 from the HLR, the GMSC requests a Mobile Station Roaming Number (MSRN) 253 from the IP SGP 221. After receiving this request, the IP SGP 221 transmits an MSRN request message 254 to the LSSC 218. The LSSC responds to this message with the MSRN 255, which it transmits to the IP SGP 221. After receiving this response, the IP SGP 221 provides the MSRN 256 to the GMSC. In some embodiments, the MSRN 256 provided to the GMSC is associated with the PBX, rather than any specific mobile station. Accordingly, after receiving the MSRN, the GMSC forwards the call to the PBX 257. As described herein, the PBX maintained a register of currently associated of mobile devices, for example as indexed by extension number. Accordingly, the PBX is able to connect the incoming call 258 to the mobile station via the LSSC 218. After the call, release procedures may comprise transmitting a release call message from the mobile station to the PBX 259 and the PBX 219 forwarding 260, or transmitting its own, release call message to the GMSC, thereby disconnecting the call.

Figure 7:
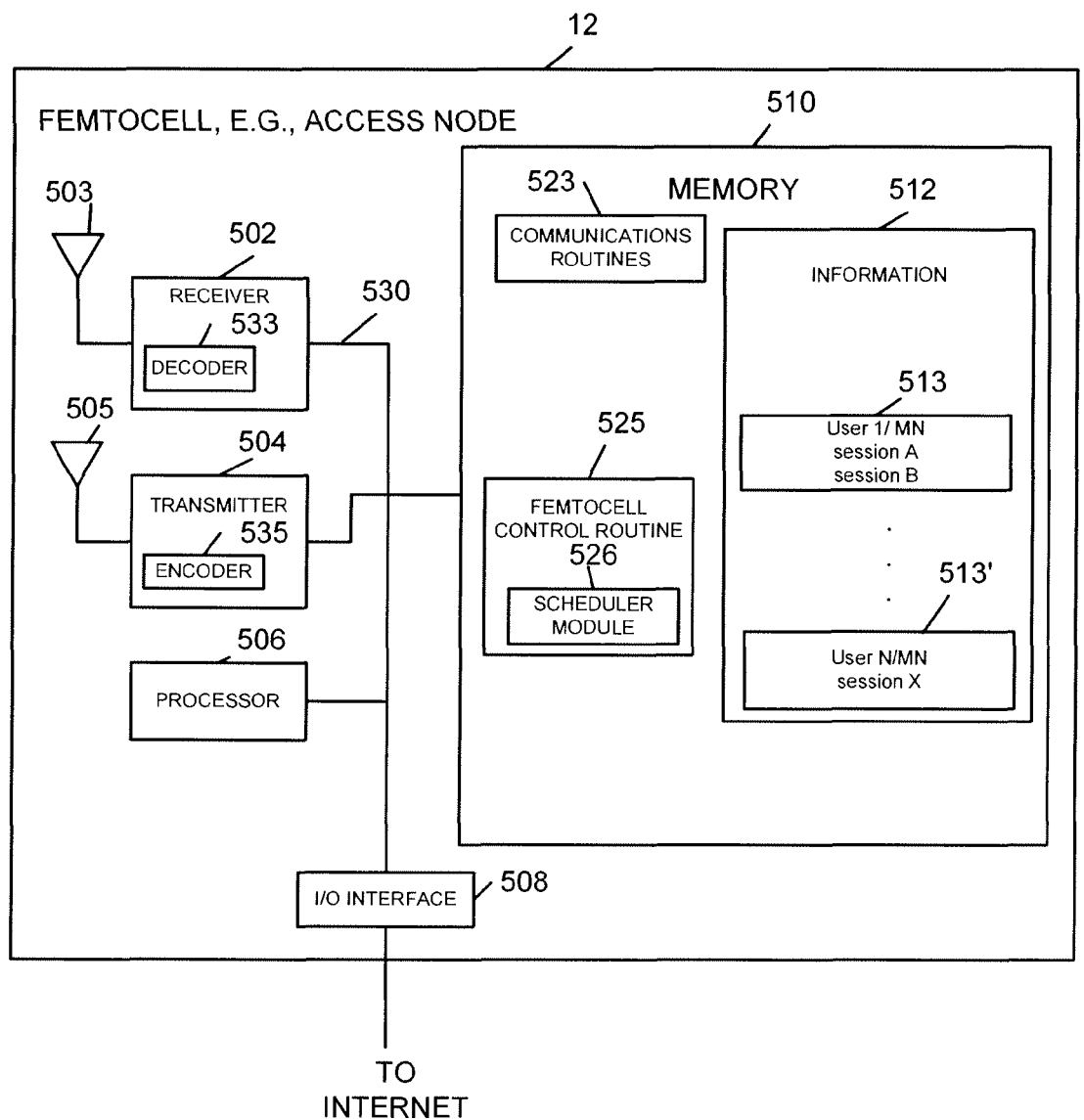
FIG. 7 illustrates an exemplary femtocell or access node according to an embodiment of the invention.

FIG. 7 illustrates an exemplary access router, e.g., femtocell 12, implemented in accordance with the invention. The femtocell 12 includes antennas 503, 505 and receiver transmitter circuitry 502, 504. The receiver circuitry 502 includes a decoder 533 while the transmitter circuitry 504 includes an encoder 535. The circuitry 502, 504 is coupled by a bus 530 to an I/O interface 508, processor (e.g., CPU) 506 and memory 510. The I/O interface 508 couples the femtocell 12 to the IP network and/or licensed spectrum switch controller 102. The memory 510 includes routines, which when executed by the processor 506, cause the femtocell 12 to operate in accordance with the invention. Memory includes communications routines 523 used for controlling the femtocell 12 to perform various communications operations and implement various communications protocols. The memory 510 also includes a femtocell control routine 525 used to control the femtocell 12 to implement the steps of the method of the present invention described above in the sections which discuss Access router, e.g., femtocell, operation and signaling. The femtocell control routine 525 includes a scheduling module 526 used to control transmission scheduling and/or communication resource allocation. Thus, module 526 may serve as a scheduler. Memory 510 also includes information used by communications routines 523, and control routine 525. The information 512 includes an entry for each active mobile station user 513, 513' which lists the active sessions being conducted by the user and includes information identifying the mobile station (MT) being used by a user to conduct the sessions.

Figure 8:
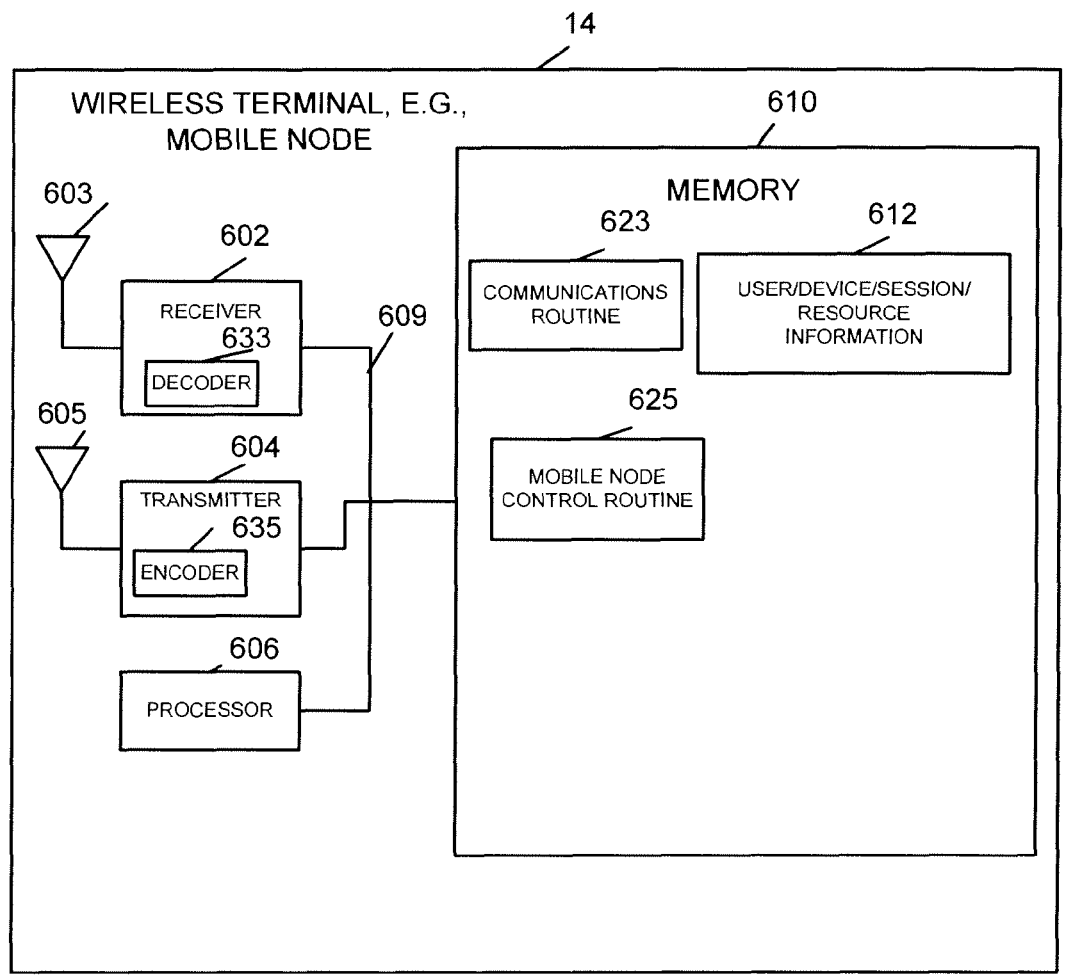
FIG. 8 illustrates an exemplary mobile node according to an embodiment of the invention.

FIG. 8 illustrates an exemplary mobile node 14 implemented in accordance with the present invention. The mobile node 14 may be used as a mobile terminal (MT). The mobile node 14 includes receiver and transmitter antennas 603, 605 which are coupled to receiver and transmitter circuitry 602, 604 respectively. The receiver circuitry 602 includes a decoder 633 while the transmitter circuitry 604 includes an encoder 635. The receiver transmitter circuits 602, 604 are coupled by a bus 609 to a memory 610. Processor 606, under control of one or more routines stored in memory 610 causes the mobile node to operate in accordance with the methods of the present invention as described above. In order to control mobile node operation memory includes communications routine 623, and mobile node control routine 625. The mobile node routine is responsible for insuring that the mobile node operates in accordance with the methods of the present invention and performs the steps described above in regard to mobile node operations. The memory 610 also includes user/device/session/resource information 612 which may be accessed and used to implement the methods of the present invention and/or data structures used to implement the invention.

Figure 9:
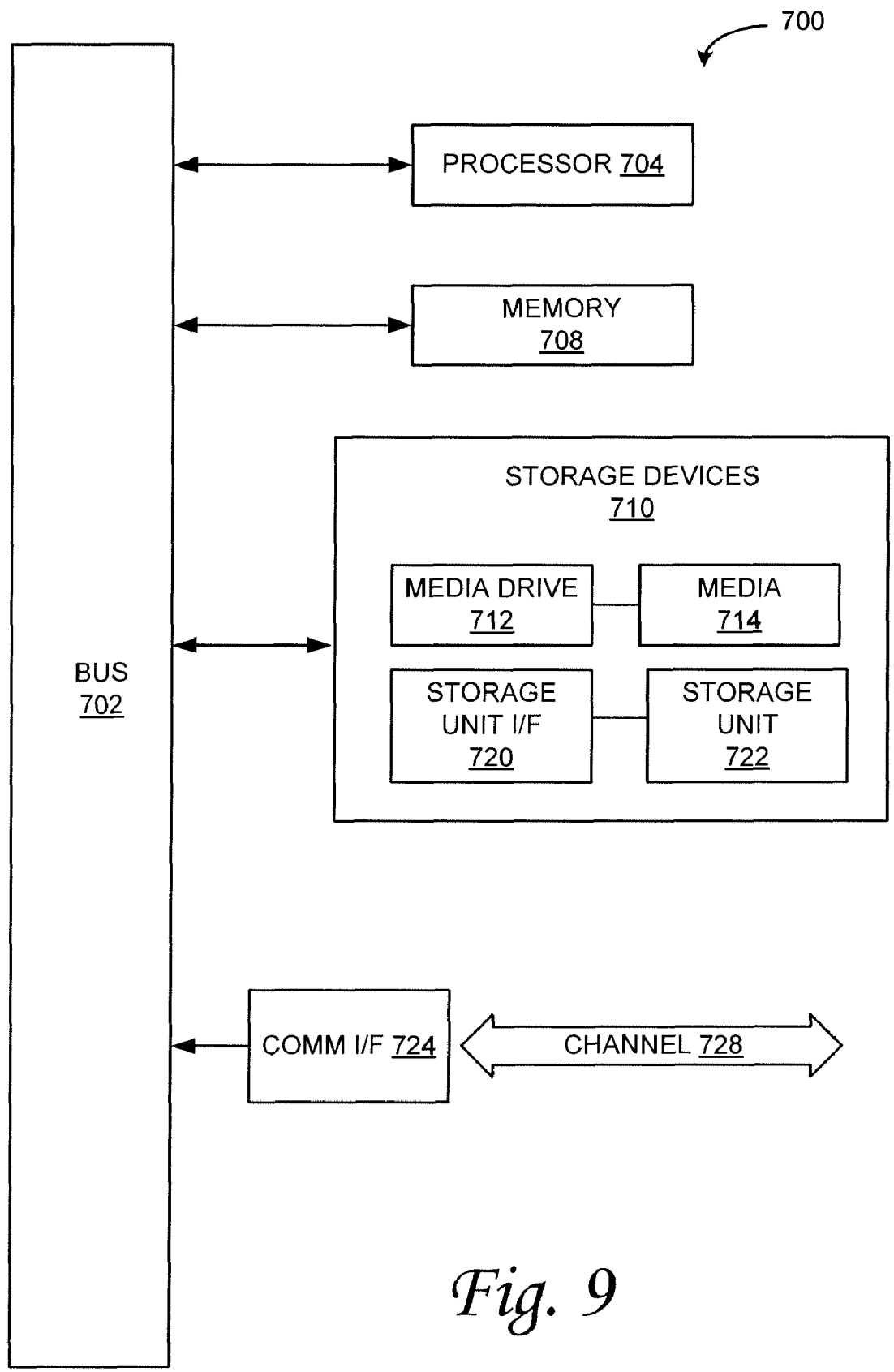
FIG. 9 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 700. After reading this description, it will become apparent to a person skilled in the relevant art how to implement the invention using other computing modules or architectures.

Referring now to FIG. 9, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof, the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Certain terms used herein may be synonymous or interchangeable to one of ordinary skill in the art. For example, in the description of some embodiments the terms "number" and "identity" are generally equivalent terms to one of ordinary skill in art; for example, E.164 numbers or identities, telephone mobile numbers, or SIP identifiers all constitute "numbers" or "identifiers". However, the description of other embodiments, the use of these terms may have a more specific ordinary meaning as understood by one of ordinary skill in the art. The use of these terms in the general or specific sense will be apparent to one of ordinary skill in the art according to their context. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A network device for performing private branch exchange communications on a femtocell network, the device comprising:
   a first communications module configured to communicate with a femtocell;
   a second communications module configured to communicate with a mobile switching center controlled by a network operator and with a private branch exchange;
   a controller configured to generate an association number with a mobile station connected to the femtocell, receive an incoming call destined for the mobile station from a central telephone network through the second communications module, and route the incoming call to the mobile station through the femtocell; and
   the controller further configured to generate a second association number with a second mobile station connected to the femtocell, receive a second incoming telephone call destined for the second mobile station from the central telephone network through the second communications module, and route the second incoming call to the second mobile station through the femtocell, and
   wherein the private branch exchange verifies a register state of mobile stations within the femtocell network based on information obtained from a register module, and wherein the private branch exchange recognizes that a call originating from a mobile station within the femtocell network is destined from another mobile station within the femtocell network, and performs local call switching without utilizing an external cellular network or the femtocell network.

2. The network device of claim 1, wherein the communication with the femtocell occurs via a second network module and wherein the second network module is configured to authenticate the mobile station.

3. The network device of claim 2, wherein the first communications module is configured to communicate with a plurality of femtocells,
wherein the controller is configured to route incoming call to a femtocell of the plurality that is connected to the mobile station, and
wherein the network device is communicatively connected to the private branch exchange that is separate from the femtocell network and that is separate from the central telephone network.

4. The network device of claim 1, wherein the controller is further configured to generate a temporary identification number to associate the mobile station connected to the femtocell.

5. The network device of claim 4, wherein the temporary identification number comprises an extension number or a SIM identity.

6. The network device of claim 1, wherein the controller is further configured to communicate with a register module that maintains a register of states of connected mobile stations.

7. The network device of claim 6, wherein the register of states further comprises locations and call states of connected mobile stations.

8. A network device configured to perform private branch exchange and cellular communications, comprising:
a first communications module configured to provide cellular phone coverage to communicate with a mobile station;
a second communications module configured to communicate with a mobile switching center controlled by a network operator and with a private branch exchange;
a control module configured to associate a connected mobile station with an association number, register the association number with the network operator, and direct an incoming telephone call destined for the mobile station from a central telephone network through the second communications module, to the mobile station using the association number; and
a third communications module configured to communicate with a femtocell, and wherein the control module is further configured to associate a mobile station connected to the femtocell at a second association number, register the second association number with the network operator, and direct a second incoming telephone call destined for the second mobile station to the second mobile station using the second association number.

9. The network device of claim 8, wherein the control module is further configured to maintain a register of states of the connected mobile stations and to direct the first or second incoming telephone call according a state of the destination mobile station.

10. The network device of claim 9, wherein the association number comprises a predetermined extension number determined according to the mobile station's identity.

11. The network device of claim 9, wherein the control module is configured to register the location of the network device as the location of the mobile station with the network operator to register the association number with the network operator, and
wherein the network device is disposed in a private branch exchange that is separate from a femtocell network that includes the femtocell and that is separate from the central telephone network.

12. The network device of claim 1, wherein the controller comprises a licensed spectrum switched controller (LSSC) that is directly connected to the private branch exchange.

13. The network device of claim 1, wherein the controller comprises a licensed spectrum switched controller (LSSC) that is connected to the private branch exchange by way of a gateway.

14. The network device of claim 1, wherein extension based calling takes place entirely within the femtocell network by usage of the private branch exchange.

15. The network device of claim 1, wherein, when the mobile station is connected to a femtocell of the femtocell network, the controller registers presence of the mobile station and informs the private branch exchange that the mobile station should remain associated with the femtocell until a predetermined disconnection event occurs.

16. The network device of claim 15, wherein the private branch exchange generates a temporary identity for the mobile station that comprises an extension that is pre-associated with the mobile station and that is reused whenever the mobile station connects to the femtocell network.

17. The network device of claim 15, wherein the mobile station is assigned two or more temporary identities, in which one of the temporary identities is an ISDN identifier that is generated outside of the femtocell network, and in which another of the temporary identities is locally generated at the femtocell network.

18. The network device of claim 1, wherein the controller registers, with the central telephone network, the private branch exchange as corresponding to a current location of the mobile station.

19. The network device of claim 1, wherein the controller maintains a register of call states of the mobile station, and wherein an incoming call originating outside of the femtocell network and destined form the mobile station is automatically forwarded by the controller to a proper location within the femtocell network or the central telephone network according to whether or not the mobile station is free to accept the incoming call.

20. The network device of claim 1, wherein the private branch exchange maintains a register of call states of the mobile station, and wherein an incoming call originating outside of the femtocell network and destined form the mobile station is automatically forwarded, based on information provided by the private branch exchange, to a proper location within the femtocell network or the central telephone network or the private branch exchange according to whether or not the mobile station is free to accept the incoming call.

* * * * *